United States Patent [19]
Richardson et al.

[11] 3,756,769
[45] Sept. 4, 1973

[54] HEAT TUNNEL APPARATUS

[75] Inventors: Oliver F. Richardson, Dallas, Tex.; Robert S. Easton; Roger L. Jack, both of Oklahoma City, Okla.

[73] Assignee: Emerald Manufacturing Corporation, Oklahoma City, Okla.

[22] Filed: Jan. 3, 1972

[21] Appl. No.: 215,070

[52] U.S. Cl. .............................................. 432/142
[51] Int. Cl. .............................................. F27b 9/16
[58] Field of Search .................... 263/7; 219/388; 34/236; 432/142

[56] References Cited
UNITED STATES PATENTS

| | | | |
|---|---|---|---|
| 3,578,747 | 5/1971 | Schramm | 263/7 |
| 3,277,813 | 10/1966 | Luscher | 219/388 X |
| 232,882 | 10/1880 | Bennett | 263/7 |
| 1,791,504 | 2/1931 | Hutchinson | 263/7 |
| 3,204,549 | 9/1965 | Palowsky | 219/388 X |
| 2,973,568 | 3/1961 | Greger | 263/7 |

Primary Examiner—John J. Camby
Attorney—Jerry J. Dunlap, Charles A. Codding et al.

[57] ABSTRACT

An improved heat tunnel apparatus for applying heat to predetermined, selected objects having a heated table partially disposed within a heat chamber, the table being rotatingly supported and constructed to receive the objects to be heated and rotatingly move the objects through the heat chamber, which is particuarly useful for sealing overlapping edges of a film-like covering such as a polyvinyl chloride material or the like wherein the film-like material encompasses the object. The object to be heated is disposed on the rotating table such that the overlapping edges engage the heated upper surface of the table and are sealed thereby, and the object is subsequently moved through the heat chamber to shrink the encompassing material about the object, the object to be heated being then withdrawn from the heat chamber and removed from the rotating table via an improved take-off assembly which engages the object, partially lifts the object from the table and moves the object to a removed position.

13 Claims, 7 Drawing Figures

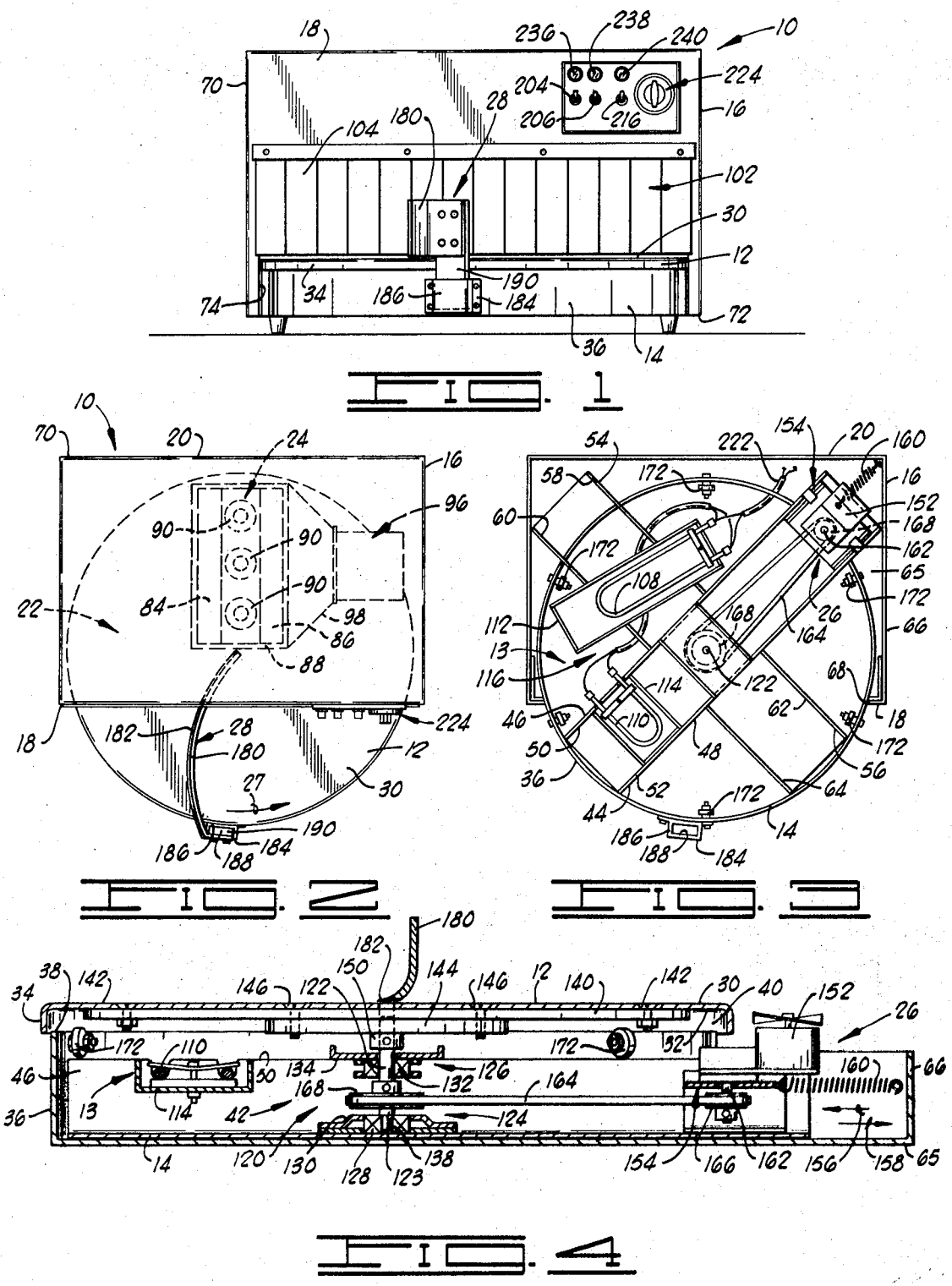

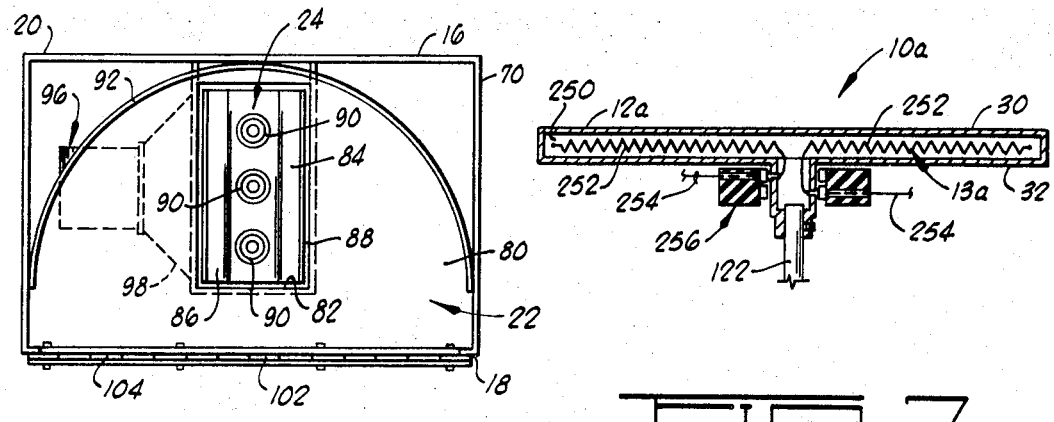
FIG. 5
FIG. 7
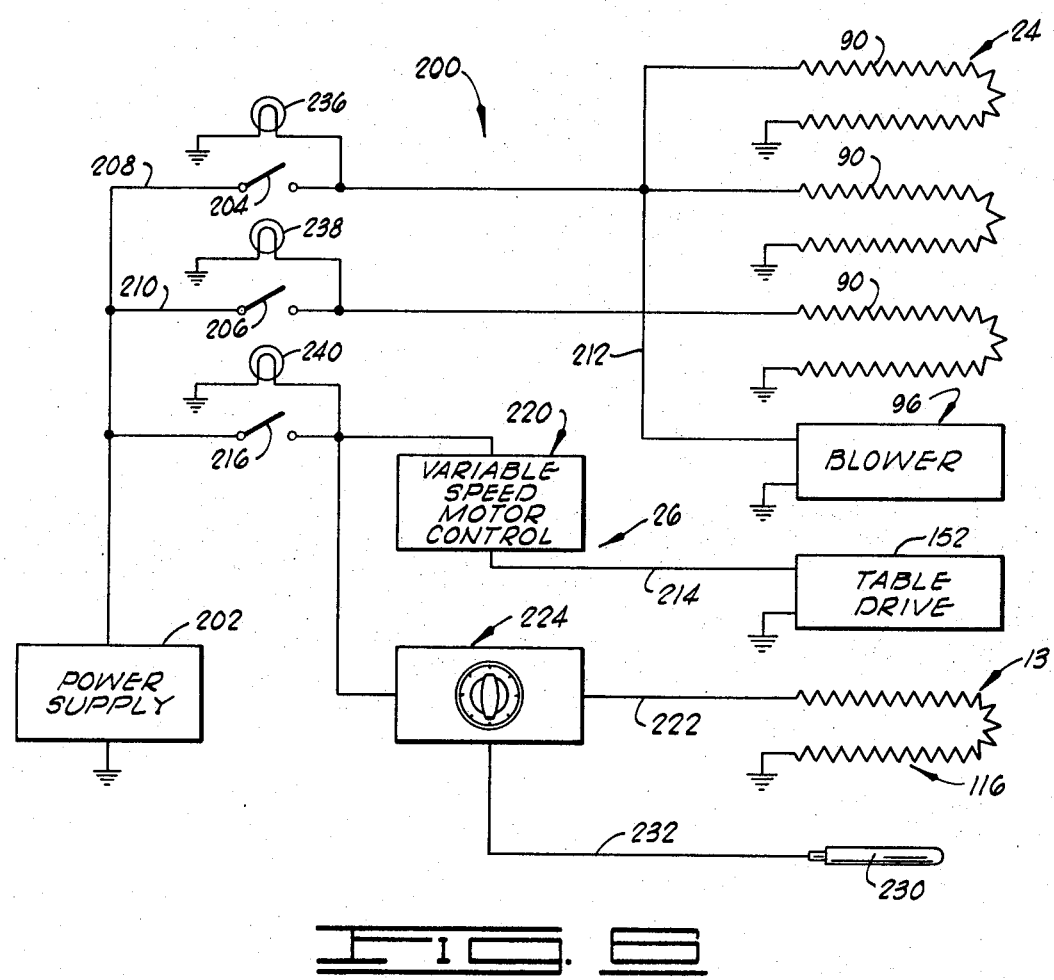
FIG. 8

HEAT TUNNEL APPARATUS

BACKGROUND OF THE INVENTION

1. Field of the Invention

This invention relates generally to improvements in heat chambers and, more particularly, but not by way of limitation to an improved heat tunnel apparatus having a rotating table for moving the object to be heated into and through a heat chamber.

2. Brief Description of the Prior Art

In the past, there have been many devices constructed to form a heat chamber wherein a predetermined amount of heat is supplied to an object disposed therein, including a heat chamber wherein the object to be heated is moved into and withdrawn from the heat chamber via a rail-type supporting structure, the applied heat being utilized to stress relieve the object being heated. One other heat tunnel or heat chamber type of apparatus constructed in the past includes a front opening and a read opening formed through a heat chamber structure and a conveyor belt type assembly extending through the front and the rear opening of the heat chamber structure. This latter-mentioned type of structure also included an assembly for heating the conveyor belt, the conveyor belt receiving the objects to be heated and moving the objects through the heat chamber via the front opening and withdrawing the objects from the rear opening. In this type of heat tunnel structure, the period of time during which the object was disposed within the heat chamber and the period of time during which the object was disposed on the conveyor belt-like structure after removal from the heat chamber was controlled by the length of the heat chamber and the length of the conveyor belt structure, thereby imposing installation space design considerations on the heat tunnel apparatus to be compromised with the above-mentioned time requirements. This type of heat tunnel structure also generally required at least two operators, one operator stationed to initially position the objects to be heated on the conveyor beltlike structure and the other operator being stationed to remove or otherwise dispose of the objects being removed from the heat chamber.

SUMMARY OF THE INVENTION

An object of the invention is to provide an improved heat tunnel apparatus wherein the period of time during which the object to be heated is disposed on the heated supporting surface is more efficiently and more effectively controlled.

Another object of the invention is to provide an improved heat tunnel apparatus wherein the period of time during which the object to be heated is disposed within the heat chamber is controlled in a more effective and more efficient manner.

A further object of the invention is to provide an improved drive assembly for rotating a heated table wherein the table is partially disposed in a relatively high temperature environment.

One other object of the invention is to provide an improved heat tunnel apparatus having a more efficient and more economical means for moving the object to be heated through a heated environment and simultaneously applying heat to the supported surface of the object.

A still further object of the invention is to provide an improved apparatus for applying heat to the overlapping portions of a film-like material to seal the material about an object and for moving the wrapped object through a heated environment to shrink fit the wrapped material about the object.

Another object of the invention is to provide an improved means for supporting a heated table wherein the heated table is rotatingly moved through a heated environment.

An additional object of the invention is to provide an improved heat chamber for applying heat to an object disposed therein in a more efficient and more economical manner.

Another object of the invention is to provide an improved heat tunnel apparatus having a heated table for moving the object into and through a heat chamber and subsequently removing the object from a supported position on the heated table.

A yet further object of the invention is to provide a heat tunnel apparatus which is economical in construction and operation.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a front elevational view of a heat tunnel apparatus constructed in accordance with the present invention.

FIG. 2 is a top plan view of the heat tunnel apparatus of FIG. 1 showing a portion of the rotating table and a portion of the chamber heat assembly in dashed-lines.

FIG. 3 is a top plan view of the table support base having the table removed therefrom and showing one embodiment of the table heat assembly.

FIG. 4 is a partial sectional, partial elevational view through the base and the table, showing the table rotatingly supported on the base and the drive assembly for rotating the table.

FIG. 5 is a plan view of the upper end portion of the housing showing the chamber heat assembly and a portion of the blower assembly in dashed-lines.

FIG. 6 is a partial schematic, partial diagrammatical view of the control assembly of the heat tunnel apparatus of FIG. 1.

FIG. 7 is a sectional view of a modified table having a modified table heat assembly supported therein.

DESCRIPTION OF THE PREFERRED EMBODIMENT

Referring to the drawings in general, in the FIGS. 1, 2 and 3 in particular, shown therein designated by the general reference numeral 10 is a heat tunnel apparatus for supporting and applying heat to the supported surface of objects to be heated (not shown), moving the objects to be heated through a heat chamber and subsequently withdrawing the objects from the heat chamber and removing the objects from a supported position on a portion of the heat tunnel apparatus 10. The heat tunnel apparatus 10 generally includes: a table 12 which is constructed to support the objects to be heated and apply heat to the supported surface of the objects; a table heat assembly 13; a base 14 having a portion connected to a portion of the table 12 for rotatingly supporting the table 12 in an assembled position; a housing 16 having a front end 18 and a rear end 20, a portion of the housing 16 being constructed to form a heat chamber 22; a chamber heat assembly 24 supported on a portion of the housing 16, the chamber heat assembly 24 being in communication with the heat chamber 22 and constructed for supplying heat generally within the heat chamber 22 in an activated position of the chamber heat assembly 24; a drive assembly 26 having a portion drivingly connected to the table 12 for rotating the table 12 in a direction 27 to continuously move the objects to be heated into and through the heat chamber 22 in an activated position of the drive assembly 26; and a take-off assembly 28 having a portion disposed generally over a portion of the table 12 to engage and guidingly move the objects emerging from the heat chamber 22 to a removed position with respect to the heat tunnel apparatus 10 and, more particularly, with respect to the table 12, as will be described in greated detail below.

Although the heat tunnel apparatus 10 is constructed to apply heat to various objects, the heat tunnel apparatus 10 is, more particularly, constructed to seal and shrink fit a film-like material such as a material known generally in the art as a polyvinyl chloride (PVC) type of material which is initially wrapped about a particular object such as a prepared or precut food product, for example. In this type of application, the prepared food product, such as a blended cheese mixture or blended meat mixture, is initially disposed within an open container and the container is then encompassingly wrapped with the polyvinyl chloride film-like material, sometimes referred to below simply as the encompassing material, such that the ends of the emcompassing material are disposed in an overlapping relationship generally on one side of the container. The wrapped object is then disposed on the table 12 and positioned thereon such that the overlapping ends of the encompassing material are disposed generally adjacent the upper surface of the table 12, the portion of the object disposed adjacent the upper surface of the table 12 being sometimes referred to below as the supported surface of the object for the purpose of clarity of description and identification. Heat is initially applied to the overlapping surfaces of the encompassing material by the table heat assembly 13 via the table 12 to seal the encompassing material about the object, and the object is subsequently rotated into and through the heat chamber 22 wherein the object is substantially encompassed by heat produced via the chamber heat assembly 24 to shrink fit the encompassing material about the object, the object then being withdrawn from the heat chamber 22 and moved to a removed position via the take-off assembly 28, in a manner which will be described in greated detail below.

As shown more clearly in FIGS. 1, 2 and 4, the table 12 is generally circularly shaped and has an upper surface 30 and a lower surface 32, the upper surface 30 being constructed to receive and support the objects to be heated during the operation of the heat tunnel apparatus 10. In a preferred form and as shown in the drawings, the table 12 is also constructed to be heated via the table heat assembly 13 for applying heat directly to the object to be heated supported thereon and to cooperate with the chamber heat assembly 24 for maintaining a predetermined amount of heat generally within the heat chamber 22.

Since in a preferred operational embodiment the heat tunnel apparatus 10 is utilized to seal and shrink fit a film-like material about a container or object, the table 12 and, more particularly, the upper surface 30 thereof is constructed to receive and convey heat to the object in such a manner that a tendency of the encompassing material to adhere to the supporting upper surface 30 of the table 12 is substantially reduced, thereby facilitating the removal of the object from the table 12. More particularly, the table 12 is, in a preferred form, constructed of a cast aluminum and has an anodized aluminum upper surface 30, in one form, to facilitate the conveying of heat through the table 12 and to substantially reduce any adhering tendencies of the object to the upper surface 30 of the table 12. In one other form, the upper surface 30 of the table 12 is coated with a low friction material to effectively reduce any adhering tendency of the object to the upper surface 30 of the table 12.

As shown more clearly in FIG. 4, the table 12 has a downwardly extending flange portion 34 formed about the outer periphery of the table 12. The downwardly extending flange portion 34 is, more particularly, constructed to cooperate with a portion of the base 14 to retain and direct the heat generated by the table heat assembly 13 for heating the table 12 during the operation of the heat tunnel apparatus 10, as will be described in greater detail below.

As shown more clearly in FIGS. 1, 3 and 4, the base 14 has a generally circularly shaped flange portion 36 which extends generally upwardly therefrom terminating with an annular upper end 38. The annular flange 36 of the base 14 is sized and the table 12 is supported generally above the upper end 38 of the base 14, such that a clearance gap 40 exists and is formed between the upper end 38 of the flange portion 36 and the lower surface 32 of the table 12 to prevent frictional engagement therebetween during the rotation of the table 12. The flange portion 36 of the base 12 and the lower surface 32 of the table 12 cooperate to form a lower heat chamber 42 for retaining and directing the heat generated by the table heat assembly 13 to heat the table 12 during the operation of the heat tunnel apparatus 10, as will be described in greater detail below.

As shown more clearly in FIG. 3, the base 14 has a channel 44 which extends diametrically across the base 14, one end of the channel 44 intersecting and extending through a portion of the base 14. The channel 44 has spaced, opposite sides 46 and 48, each opposite side 46 and 48 extending a distance upwardly from the base 14 terminating with upper ends 50 and 52, respectively. The diamterically extending first channel 44 is constructed to provide structural support for a portion of the table heat assembly 13 and the portion of the drive assembly 26, and the upper sides 46 and 48 of the channel 44 are each sized such that the upper ends 50 and 52 thereof are disposed in a horizontal plane generally below the horizontal planar disposition of the upper end 38 of the base 14, for reasons and in a manner which will be described in greater detail below.

The base 14 also includes a pair of radially extending channels 54 and 56, the channel 54 having one end disposed adjacent a mid portion of the side 50 of the diametrically extending channel 44 and extending radially outwardly therefrom, and the radially extending channel 56 having one end disposed adjacent a midportion of the side 48 of the diametrically extending channel 44 and extending radially therefrom. A portion of the radially extending channel 54, generally near the end thereof opposite the end adjacent a portion of the diametrically extending channel 44, intersects and extends through a portion of the flange 36 of the base 14.

The radially extending channel 54 has spaced sides 58 and 60, each of the sides 58 and 60 extending generally upwardly from the base 14 and terminating with upper end portions disposed in a horizontal plane generally coplanar with the upper end portions 50 and 52 of the diametrically extending channel 44. The radially extending channel 56 also includes spaced, opposite sides 62 and 64, each of the sides 62 and 64 extending generally upwardly from the base 14 and terminating with upper end portions disposed in a horizontal plane generally coplanar with the upper ends 50 and 52 of the diametrically extending channel 44. The diametrically extending channel 44 and the radially extending channels 54 and 56 each provide augmenting structural support for the base 14, and the radially extending channel 54 also provides structural support for a portion of the table heat assembly 13, in a manner which will be described in greated detail below.

As shown more clearly in FIG. 3, the housing 16 includes a housing base 65 having a peripherial flange 66 formed about the outer perimeter thereof, the peripherial flange 66 extending generally upwardly from the housing base 65. An opening 68 is formed through a portion of the peripherial flange 66, and a portion of the base 14 is disposed and supported on a portion of the housing base 65 such that a portion of the base 14 extends through the opening 68 in the peripherial flange 66. In a preferred form, the ends of the peripherial flange 66 formed by the opening 68 therethrough are secured to the adjacent portions of the base 14 such that the base 14 and the housing base 65 provide an integral, unitary type of structure.

The housing 16 also includes an upper enclosure 70 which is basically rectangularly shaped and has an open lower end 72. An opening 74 is formed through the front end 18 portion of the upper enclosure 70, a portion of the opening 74 intersecting the lower end 72 of the upper enclosure 70. More particularly, the periphery formed by the open lower end 72 of the upper enclosure 70 is shaped to matingly fit about the peripherial flange 66 of the housing base 65, the upper enclosure 70 being secured to the peripherial flange 66 of the housing base 65 generally near the open lower end 72 thereof, in an assembled position of the housing 16, as shown more clearly in FIGS. 1 and 2.

It should also be noted that the opening 74 is formed through the upper enclosure 70 such that, in an assembled position of the housing base 65 and the upper enclosure 70, the opening 74 through the upper enclosure 70 is generally aligned with the opening 68 through the housing base 65. The housing base 65 thus provides the basic structural support for the upper enclosure 70, the housing base 65 and the upper enclosure 70 being secured in an assembled position to form the housing 16, and the housing base 65 also providing a basic supporting structure for a portion of the base 14, thereby positively positioning the base 14 with respect to the housing 16 in an assembled position.

As shown more clearly in FIGS. 2 and 5, an upper baffle 80 is supported in a portion of the heat chamber 22 and, more particularly, the upper baffle 80 is secured to a portion of the upper enclosure 70, generally near an upper end thereof, opposite the open lower end 72 of the upper enclosure 70. An opening 82 is formed through a portion of the upper baffle 80 and a reflector 84 is supported generally within the opening 82 of the upper baffle 80. The reflector 84 has a heat reflecting surface 86 shaped and disposed to reflect the heat generated by the chamber heat assembly 24 generally toward the heat chamber 22 and, more particularly, generally toward the portion of the table 12 disposed within the heat chamber 22. The reflector 84 is also sized and positioned within the opening 82 of the upper baffle 80 such that an air gap 88 exists generally between the reflector 84 and the surface formed in the upper baffle 80 by the opening 82 therethrough.

The chamber heat assembly 24 includes a plurality of heating elements 90 (three heating elements 90 being shown in the drawings). The heating elements 90 are each disposed and supported within a central portion of the reflector 84 such that the heat generated thereby is reflected via the heat reflecting surface 86 of the reflector 84 during the operation of the heat tunnel apparatus 10, as will be described in greater detail below.

A curved downwardly extending baffle flange 92, as shown more clearly in FIG. 5, is secured about the outer periphery of the upper baffle 80. The baffle flange 92 extends a distance downwardly from the upper baffle 80 and cooperates to form the heat chamber 22.

As shown more clearly in FIGS. 2 and 5, the chamber heat assembly 24 also includes a blower assembly 96 having a blower fan (not shown) and a blower baffle 98, the blower assembly 96 being supported generally above the upper baffle 80 and in communication with the heat chamber 22 to circulate the heated air in the heat chamber 22 created therein via the chamber heat assembly 24. More particularly, the blower baffle 98 is supported generally above the reflector 84 and positioned thereabove to circulatingly direct air through the air gap 88 between the reflector 84 and the upper baffle 80, thereby circulating the heat generated via the chamber heat assembly 24 throughout the heat chamber 22 during the operation of the heat tunnel apparatus 10, to be described in greater detail below.

As shown more clearly in FIG. 1, a cover 102 constructed of a plurality of cover elements 104 is secured to a portion of the housing 16 and, more particularly, is secured to a portion of the upper enclosure 70 generally above the opening 74 formed therethrough. Each of the cover elements 104 extend downwardly, generally toward the table 12, the lower end of each of the cover elements 104 being disposed generally above the upper surface 30 of the table 12. Each cover element 104 is constructed of a relatively flexible, heat resistant material and is secured to the housing 16 to substantially cover the opening 74 formed through the upper enclosure 70 of the housing 16, the cover 102 thus cooperating to retain the heat generated via the chamber heat assembly 24 generally within the heat chamber 22.

As shown more clearly in FIG. 3, the table heat assembly 13 generally includes a pair of heating elements 108 and 110, the heating element 108 being supported and secured in an assembled position generally within a tray 112 and the heating element 110 being secured and generally supported within a tray 114. The tray 112 is securedly supported within a portion of the radially extending channel 54 such that the heating element 108 is angularly disposed within the base 14 with respect to the radially extending channel 54, thereby supporting the heating element 108 generally below the lower surface 32 of the table 12 and positionning the heating element 108 to effectively radiate heat over a maximum area of the table 12 disposed thereabove. The tray 112 is supported within a portion of the diametrically extending channel 44 and positioned to support the heating element 110 generally below a portion of the table 112, the heating element 110 generating a predetermined amount of heat to augment the heat generated via the heating element 108 to heat the table 12 to a predetermined temperature level, the heating elements 108 and 110 thereby cooperating to form what is sometimes referred to below simply as the lower heating element 116.

As mentioned before, the table 12 is rotatingly supported on the base 14 and, more particularly, the table 12 is rotatingly supported on the base 14 via a table support assembly 120, as shown more clearly in FIGS. 3 and 4. The table support assembly 120 generally includes a post 122 which is rotatingly supported on a portion of the base 14, the post 122 extending a distance generally upwardly from the base 14. The lower end 123 of the post 122 is rotatingly disposed and supported within a lower bearing assembly 124, and the opposite end of the post 122 extends through and is bearingly supported by an upper bearing assembly 126. The lower bearing 124 and the upper bearing assembly 126 are similarly constructed, in a preferred form, and the lower bearing assembly 124 basically includes a bearing member 128 disposed in bearing engagement with a lower end portion of the post 122 and a bearing support 130 having a portion which is secured to the base 14 and another portion which engages and securely retains the bearing member 128 in an assembled position and in bearing engagement with the lower end portion of the post 122.

The upper bearing assembly 126 includes a bearing member 132 disposed about and in bearing engagement with a portion of the post 122, generally opposite the lower end portion 123 thereof, and a bearing support 134 having a portion engaging and securedly retaining the bearing member 132 in bearing engagement with a portion of the post 122 extending therethrough. The bearing support 134, more particularly, extends between the sides 46 and 48 of the diametrically extending channel 44, one end of the bearing support 134 being secured to a portion of the upper end 50 of the side 46 and the opposite end of the bearing support 134 being secured to a portion of the upper end 52 of the side 48.

The diametrically extending channel 44 thus supports the upper bearing assembly 126, and the lower bearing assembly 124 is secured to a portion of the base 14, as mentioned before. In a preferred form and as shown more clearly in FIG. 4, a portion of the post 122, generally near the lower end 123 thereof, has a smaller diameter than the remaining portion of the post 122, thereby forming a downwardly facing rim 138 extending circumferentially about the post 122. The rim 138 is positioned on the post 122 and sized to engage a portion of the bearing member 128 of the lolower bearing assembly 124 to limit the downward movement of the post 122, generally toward the base 14, the lower bearing assembly 124 thereby rotatingly supporting the post 122 in a position wherein the lower end 123 of the post 122 is spaced a distance from the base 14, as shown more clearly in FIG. 4, to eliminate frictional engagement between the post 122 and the base 14 during the rotation of the table 12. It will be apparent to those skilled in the art from the foregoing description that the lower bearing assembly 124 also functions as a thrust bearing supporting the table load during the operation of the heat tunnel apparatus 10.

As shown more clearly in FIG. 4, a stiffener 140 is secured to the lower surface 32 of the table 12 via a plurality of fasteners 142, and a disc member 144 is secured to the lower surface of the stiffener 140 via a plurality of fasteners 146. The stiffener 140 and the disc member 144 each have an opening formed therethrough for receiving a portion of the upper end of the post 122 which extends therethrough in an assembled position of the heat tunnel apparatus 10. The stiffener 140 maintains the structural integrity of the table 12 and reduces the detrimental effect of distortion of the table 12 resulting from the heat being applied thereto via the table heat assembly 13 and the chamber heat assembly 24, and also provides a structure wherein the table 12 can be constructed of an anodized aluminum or coated with a relatively friction free material and yet the structural integrity of the table 12 can be maintained via a stiffener 140 constructed of a substantially less expensive material, since the stiffener 140 will not engage the object to be heated during the operation of theheat tunnel apparatus.

A retainer 150 is secured to a portion of the post 122, generally near the upper end thereof, the retainer 150 engaging a portion of the disc member 144 and locating the horizontal didisposition of the table 12 with respect to the base 14. More particularly, the retainer 150 is positioned on the post 122 to support the table 12 generally above the base 14 to maintain the gap 40 between the upper end 38 of the circularly shaped flange portion 36 of the base 14 and the table 12, as described before.

The drive assembly 26 of the heat tunnel apparatus 10 includes a table drive 152, which may be an electric motor for example, movably secured to a portion of the base 14 via a drive support 154. The drive support 154 movably positions the table drive 152 on the base 14 such that the table drive 152 can be moved in a direction 156, generally towards the post 122, and in an opposite direction 158, generally away from the post 122. More particularly, the drive support 154 is movably supported between the sides 46 and 48 of the diametrically extending channel 44, and a portion of the drive support 154 is in sliding engagement with a portion of the diametrically extending channel 44 during the operation of the heat tunnel apparatus 10, for reasons and in a manner to be described in greater detail below.

As shown more clearly in FIGS. 3 and 4, one end of a bias spring 160 is connected to a portion of the table drive 152 and, more particularly, to a portion of the drive support 154, the opposite end of the bias spring 160 being secured to a portion of the housing base 65. The bias spring 160 thus biases the drive support 154 in a direction 158 generally away from the post 122.

The table drive 152 has an output drive shaft 162 which is drivingly connected to the post 122 via an interconnecting belt 164, the belt 164 drivingly engaging a pulley 166 secured to the output drive shaft 162 of the table drive 152 and drivingly engaging a pulley 168 secured to the post 122. The belt 164 and the driving interconnection between the belt 164 and the pulleys 166 and 168 thus provide the driving interconnection between the table drive 152 and the post 122 for rotatingly driving the post 122 in an activated position of the table drive 152. Since the post 122 is secured to the table 12, the table 12 is thus rotatingly driven by the table drive 152 via the driving interconnection between the table drive 152 and the post 122.

The bias spring 160 is, more particularly, constructed and positioned to bias the drive support 154 in a direction 158 to maintain a predetermined, controlled tension on the belt 164, thereby maintaining the driving connection between the belt 164 and the output drive shaft 162 of the table drive 152 and the driving connection between the belt 164 and the post 122 during the operation of the heat tunnel apparatus 10. The drive assembly 26 is thus constructed such that the table drive 152 is movably supported on the base 14 for automatically compensating for expansion and contraction of the belt 164 resulting from the heat generated via the table heat assembly 13 and the chamber heat assembly 24, thereby maintaining a controlled, driving engagement between the table drive 152 and the table 12 during the operation of the heat tunnel apparatus 10.

Although the table 12 has a stiffener 140 and a disc member 144 secured thereto to provide augmenting structural integrity for compensating for heat distortion of the table 12 during the operation of the heat tunnel apparatus 10, the heat tunnel apparatus 10 also include a plurality of roller bearing members 172, each roller bearing member 172 being secured to a portion of the flange 36 of the base 14, generally near the upper end 38 thereof. The roller bearing members 172 (six roller bearing members being shown in FIG. 3) are each rollingly supported on the base 14 and spaced about the periphery of the flange portion 36 thereof and each of the roller bearing members 172 are positioned to engage a portion of the lower surface 32 of the table 12 in one position of the table 12 wherein the table 12 has been distorted or misaligned, thereby substantially preventing the lower surface 32 of the table 12 from frictionally engaging the upper end 38 of the flange 36 during the operation of the heat tunnel apparatus 10.

As shown more clearly in FIGS. 1, 2 and 4, the take-off assembly 28 includes a curved blade 180 having a leading edge 182, the curved blade 180 being supported generally above the upper surface 30 of the table 12 in an assembled position wherein the leading edge 182 of the curved blade 180 is disposed generally near the upper surface 30 of the table 12 via a take-off support 184. The take-off support 184 basically includes a channel member 186 which is secured to a portion of the flange 36 of the base 14, as shown more clearly in FIGS. 1, 2 and 3, the channel member 186 having an opening 188 formed therethrough for removably receiving one end portion of a support arm 190. The end of the support arm 190, opposite the end thereof removably disposed in the opening 188 of the channel member 186, is secured to one end of the curved blade 180, the channel member 186 being positioned to receive a portion of the support arm 190 and cooperate therewith to support the curved blade in an assembled position over a portion of the upper surface 30 of the table 12, as shown more clearly in FIG. 2.

The curved blade 180 is shaped and disposed over the table 12 such that the leading edge 182 thereof initially engages the object supported on the table 12 emerging from the heat chamber 22 and partially lifts the object from the upper surface 30 of the table 12, the curved blade 180 cooperating with the lifting leading edge 182 thereof being shaped to guidingly move the object generally off the table 12 to a removed position as the table 12 is rotated in a direction 27. As mentioned before, the heat tunnel apparatus 10 is particularly constructed to be utilized to seal and shrink fit a film-like material about a container and the container contents, the take-off assembly 28 being thus constructed to lift and partially separate the encompassingly wrapped object for subsequent removal from the table 12.

The heat tunnel apparatus 10 also includes a control assembly 200, the control assembly 200 being schematically and diagrammatically shown in FIG. 6. The control assembly 200 basically includes a power supply 202 which is connected to the chamber heat assembly 24 via a switch 204 and a switch 206, the power supply 202 also being connected to the blower of the blower assembly 96 via the switch 204. More particularly, the power supply 202 is connected to two of the heating elements 90 via a conductor 208 and the switch 204 is interposed in the conductor 208 to establish electrical communication between the power supply 202 and the two heating elements 90 of the chamber heat assembly 24 in a closed position thereof. The power supply 202 is connected to the third heating element 90 of the chamber heat assembly 24 via a conductor 210 and the switch 206 is interposed in the conductor 210 to establish electrical communication between the power supply 202 and the heating element 90 connected to the conductor 210 in a closed position of the switch 206.

The blower of the blower assembly 96 is connected to the power supply 202 via a conductor 212 which is, more particularly, connected to the conductor 208 generally between the switch 204 and the heating elements 90. Thus, in a closed position of the switch 204, the two heating elements 90 connected to the power supply 202 via the conductor 208 are activated and the blower of the blower assembly 96 is simultaneously activated to circulate air and move the heat generated via the heating elements 90 through the heat chamber 22. In the closed position of the switch 206, the third heating element 90 of the chamber heat assembly 22 is activated, thereby adding an additional heat source and increasing the heat capacity of the chamber heat assembly 24 which may be desirable, in some applications.

The table drive 152 is connected to the power supply 202 via a conductor 214 and a switch 216 is interposed in the conductor 214, generally between the table drive 152 and the power source 202, to establish electrical communication between the power supply 202 and the table drive 152 to activate the table drive 152 in a closed position of the switch 216. A variable speed motor control 220 is interposed in the conductor 214, generally between the switch 216 and the table drive 152, the variable speed motor control 220 being constructed to control the amount of power supplied to the table drive 152 for controllingly varying the rotating rate of the table 12 to control the period of time during which the object to be heated is disposed within the heat chamber 22. The rotating rate of the table 12 can also be varied by adjusting the variable speed motor control 220 to control the rate at which the objects supported on the upper surface 30 of the table 12 are moved through the heat chamber 22 and subsequently removed from the table 12 via the take-off assembly 28, which may be desirable in some applications.

The lower heating element 116, comprising the heating elements 108 and 110, is connected to the power supply 202 via a conductor 222, the conductor 222 being, more particularly, connected to the conductor 214 generally between the variable speed motor control 220 and the switch 216, as shown in FIG. 6. A variable resistance temperature control 224 is interposed in the conductor 222 generally between the lower heating element 116 and the switch 216, the variable resistance temperature control 224 controlling the amount of energy supplied to the lower heating element 116 by the power supply 202 in response to a sensed temperature signal from a temperature sensing element 230 connected to the variable resistance temperature control 224 via a conductor 232.

More particularly, the temperature sensing element 230 is disposed generally near the table 12 and positioned to sense the temperature of the table 12 and produce an output signal responsive thereto, the output of temperature sensing element 230 being connected to the variable resistance temperature control 224 via the conductor 232. Thus, the variable resistance temperature control 224 receives the output from the temperature sensing element 230 via the conductor 232, and is constructed to controllingly vary the power supplied to the lower heating element 116 in response to the sensed temperature of the temperature sensing element 230. In this manner, the temperature of the table 12 is automatically maintained at a predetermined, controlled temperature level during the operation of the heat tunnel apparatus 10, the predetermined level being adjustably set by positioning the control of the variable resistance temperature control 224, in a manner well known in the art.

An indicator lamp 236 is connected in parallel with the switch 204, another indicator lamp 238 is connected in parallel with the switch 206 and yet another indicator lamp 240 is connected in parallel with the switch 216. The indicator lamps 236, 238 and 240 are each constructed to be lighted when connected to the power supply 202, and each indicator lamp 236, 238 and 240 is connected to the power supply such that the lighted condition of any one of the indicator lamps 236, 238 and 240 is indicative that the switch 204, 206 or 216 associated therewith is in the closed or activated position.

OPERATION OF FIGS. 1 THROUGH 6

The heat tunnel apparatus 10, described in detail before is particularly constructed to seal and shrink fit a film-like material about a container and the container contents and, in general, is constructed to apply heat to an object supported thereon via the supporting surface 30 and to move the object through a heat chamber, the heat tunnel apparatus 10 automatically moving the object to a removed position as the object is rotatingly withdrawn from a heat chamber in a faster, more convenient and more economical manner. Initially, the switch 204 and the switch 216 are each moved to the closed position thereby activating a portion of the chamber heat assembly 24, the blower assembly 96, the table drive 152 and the table heat assembly 13. The switch 206 can also be moved to the closed position to activate the additional heating element 90 of the chamber heating assembly 24 in those applications wherein the additional heat is required within the heat chamber 22. Thus, in the initial or start position of the heat tunnel apparatus 10, the heat chamber 22 is being heated via the chamber heat assembly 24, the table 12 is being heated via the table heat assembly 13 and table 12 is being rotated in a direction 27 via the drive assembly 26.

The object to be heated is then placed on the upper surface 30 of the table 12. More particularly, in those applications wherein the object to be heated comprises a container and container contents having a film-like material wrapped thereabout, the object is placed on the table 12 such that the overlapping end portions of the film-like material are disposed adjacent the upper surface 30 of the table 12. The object is then moved via the table 12 in a general direction 27 toward the heat chamber 22, the overlapping end portions of the encompassing material being heat sealed via the heated table 12. The object is then moved initially into the heat chamber 22 and retained therein for a predetermined, controlled period of time, controlled via the rotating rate of the table 12, during which heat is applied to the film-like material to shrink fit such material generally about the container and the container contents. The object being heated is then moved from the heat chamber 22 and into engagement with the take-off assembly 28.

More particularly, the object supported on the table 12 is moved into engagement with the leading edge 182 of the curved blade 180 of the take-off assembly 178, the leading edge 182 initially lifting the object from the upper surface 30 of the table 12 and cooperating with the curved blade 180 to guidingly move the object off the table 12 to a removed position as the table 12 continues to be rotated via the drive assembly 26 in a direction 27.

It will be apparent to those skilled in the art from the foregoing, that the time period during which the object to be heated is disposed within the heat chamber 22 and the cycle time period (the time period for the object to be moved from an initial start position to a removed position) are each controlled via the variable speed motor control 220. It should also be noted that the temperature level of the table 12 can be adjustably raised and lowered via the variable resistance temperature control 224 to control the heat applied to the overlapping edges of the film-like material to form the seal therebetween and, in this manner, the overall operational rate of the heat tunnel apparatus 10 can be controllingly varied for particular applications to assure that the film-like material is sealed in an encompassing position about the container and container objects prior to the object being moved into the heat chamber 22 wherein the encompassing material is heated to shrink fit the encompassing material generally about the object, thereby assuring a positive seal and a more consistent shrink fit.

EMBODIMENT OF FIG. 7

Partially shown in FIG. 7 is a modified heat tunnel apparatus 10a having a modified table 12a and a modified table heat assembly 13a. More particularly, the modified table 12a is constructed similar to the table 12, described before, the salient difference being that the table 12a includes an opening 250 generally between the upper surface 30 and the lower surface 32 thereof. The opening 250 is sized to receive a plurality of heating elements 252 which are disposed therein to heat the table 12a, in an activated position of the heating elements 252. The heating elements 252 disposed in the opening 250 can be utilized in lieu of the heating elements 108 and 110, described before, and in some applications, the heating elements 252 can be used in addition to the heating elements 108 and 110 to comprise the table heat assembly 13. In any event, the heating elements 252 are disposed in the heating proximity to the table 12a and the position of the heating elements 252 relative to the table 12a is maintained constant during the operation of the heat tunnel apparatus 10 or, more particularly, maintained constant during the rotation of the table 12 which may be desirable in some applications.

The heating elements 252 are connected to the power supply 202 via conductors 254, the conductors 254 being connected to a brush contact element of a brush contact assembly 256. The brush contact assembly 256 is constructed to maintain electrical contact between the heating elements 252 and the conductors 254 during the rotation of the table 12a, in the manner well known in the art.

OPERATION OF FIG. 7

The modified heat tunnel apparatus 10a shown in FIG. 7 will operate substantially the same as the heat tunnel apparatus 10, described before, the salient difference being that the heating elements 252 of the table heat assembly 13 are secured in a stationary position with respect to the table 12a during the rotation of the table 12a, which may be desirable in some applications.

Changes may be made in the construction and the arrangement of the parts or the elements of the various embodiments as disclosed herein without departing from the spirit and the scope of the invention as defined in the following claims.

What is claimed is:

1. A heat tunnel apparatus for applying heat to predetermined, selected objects, comprising:

a table having an upper surface for receiving the objects to be heated and a lower surface;

base means having a portion connected to a portion of the table for rotatingly supporting the table;

table heat means disposed near a portion of the table for supplying heat to the table in an activated position of the table heat means;

a housing having a front end and a rear end and a portion forming a heat chamber, the housing disposed over a portion of the table, a portion of the table being disposed within the heat chamber;

an upper baffle supported in a portion of the heat chamber having an opening formed through a portion thereof;

a reflector supported generally within the opening in the upper baffle forming an air gap existing generally between the reflector and the upper baffle;

chamber heat means supported within the reflector, the reflector directing the heat from the chamber heat means generally toward the heat chamber, the chamber heat means supported in a portion of the housing in communication with the heat chamber for supplying heat within the heat chamber in an activated position of the chamber heat means;

blower means supported generally above the reflector and positioned to circulatingly direct the air through the air gap between the reflector and the upper baffle, the blower means communicating with the heat chamber and disposed to circulate the hot air in the heat chamber created therein via the chamber heat means;

drive means drivingly connected to the table for rotating the table to continuously move the objects to be heated into and through the heat chamber in an activated position of the drive means; and control means connected to the chamber heat means and the drive means activating the chamber heat means and the drive means in one position of the control means, a portion of the control means connected to the table heat means activating the table heat means in one position of the control means.

2. The heat tunnel apparatus of claim 1 defined further to include:

take-off means having a portion disposed generally over a portion of the upper surface of the table, the take-off means having a portion engaging the objects disposed on the upper surface of the table emerging from the heat chamber and guiding the engaged objects to a removed position.

3. The heat tunnel apparatus of claim 2 wherein the take-off means includes:

a curved blade, having a leading edge disposed generally near the upper surface of the table in an assembled position thereof, the leading edge engaging the object generally near the contacting surfaces of the object and the upper surface of the table to partially lift the object from the upper surface of the table, the curved blade shaped to guide the object to a removed position; and means connected to the curved blade removably supporting the curved blade in an assembled position in one position thereof.

4. The heat tunnel apparatus of claim 1 wherein the control means is defined further to include: temperature sensing means disposed generally near the table for sensing the temperature level of the table and providing an output responsive thereto; and variable temperature control means having a portion connected to the table heat means and a portion connected to the temperature sensing means for receiving the output from the temperature sensing means and controllingly varying the heat supplied to the table via the table heat means in response to the sensed temperature to maintain a predetermined temperature level of the table.

5. The heat tunnel apparatus of claim 1 wherein the drive means includes: means for controllingly varying the rotating rate of the table.

6. The heat tunnel apparatus of claim 1 wherein the housing includes an opening formed through a portion of the front end thereof, a portion of the table being disposed in the heat chamber through the opening in the housing; and wherein the heat tunnel apparatus is defined further to include: a cover constructed of a flexible, material secured to a portion of the housing and substantially covering the opening in the housing to cooperate in retaining the heat within the heat chamber.

7. The heat tunnel apparatus of claim 1 wherein the table heat means is defined further to include: heating element means supported within a portion of the table for rotation therewith; and wherein the heat tunnel apparatus is defined further to include: means maintaining electrical contact with the heating element means and the control means during the rotation of the table.

8. A heat tunnel apparatus for applying heat to predetermined, selected objects, comprising:

a table having an upper surface for receiving the objects to be heated and a lower surface;

base means having a portion connected to a portion of the table for rotatingly supporting the table;

a housing having a front end and a rear end and a portion forming a heat chamber, the housing disposed over a portion of the table, a portion of the table being disposed within the heat chamber;

chamber heat means supported in a portion of the housing in communication with the heat chamber for supplying heat within the heat chamber in an activated position of the chamber heat means;

table heat means disposed near a portion of the table for supplying heat to the table in an activated position of the table heat means;

a post having a lower end, the end of the post generally opposite the lower end thereof being connected to a portion of the table;

bearing means bearingly engaging the post and rotatingly supporting the post;

drive means drivingly connected to the table for rotating the table to continuously move the objects to be heated into and through the heat chamber in an activated position of the drive means, comprising:

a table drive movably supported on a portion of the base, the table drive being movable in a direction generally toward the post and in an opposite direction generally away from the post and the plate;

means drivingly connecting the table drive and the post, the table drive rotatingly driving the table via the post and driving connection between the table drive and the post; and bias means connected to the table drive biasing the table drive in a direction generally away from the post to maintain the driving engagement between the table drive, the post and the means drivingly connecting the table drive and the post, thereby movably compensating for expansion and contraction and maintaining a controlled tension of the means drivingly connecting the table drive and the post during the operation of the heat tunnel apparatus; and control means connected to the chamber heat means and the drive means activating the chamber heat means and the drive means in one position of the control means, a portion of the control means connected to the table heat means activating the table heat means in one position of the control means.

9. The heat tunnel apparatus of claim 8 wherein the chamber heat means is defined to further to include:

blower means in communication with the heat chamber disposed to circulate the hot air in the heat chamber created therein via the chamber heat means.

10. The heat tunnel apparatus of claim 8 wherein the post includes a portion engaging a portion of the bearing means, the bearing means supporting the post a distance generally above the base to eliminate frictional engagement therebetween.

11. The heat tunnel apparatus of claim 8 wherein the table is further defined as being generally circularly shaped; and wherein the base means includes a generally circularly shaped flange portion extending a distance generally upwardly therefrom terminating with an annular upper end, the table being rotatingly supported generally above the upper end of the flange portion of the base means and a clearance gap existing between the upper end of the flange portion and the lower surface of the table to prevent frictional engagement therebetween during the rotation of the table, the flange portion and the lower surface of the table defining a lower heat chamber for retaining a substantial portion of the heat from the table heat means for heating the table.

12. The heat tunnel apparatus of claim 11 defined further to include: a plurality of roller bearing means secured to the flange portion of the base means generally near the upper end thereof, the roller bearing means being spaced about the flange portion periphery and bearingly engaging a portion of the lower surface of the table in one position of the table.

13. A heat tunnel apparatus for applying heat to predetermined, selected objects, comprising:

a table having an upper surface for receiving the objects to be heated and a lower surface;

base means having a portion connected to a portion of the table for rotatingly supporting the table;

a housing having a front end and a rear end and a portion forming a heat chamber, the housing disposed over a portion of the table, a portion of the table being disposed within the heat chamber;

an upper baffle connected to the housing and supported within a portion of the heat chamber formed via the housing;

chamber heat means connected to the upper baffle and supported generally above the upper baffle, the chamber heat means positioned in communication with the heat chamber supplying heat within the heat chamber in an activated position of the chamber heat means;

blower means supported generally above the baffle and circulatingly directing the air heated via the chamber heat means within the heat chamber;

drive means drivingly connected to the table for rotating the table to continuously move the objects to be heated into and through the heat chamber in an activated position of the drive means;

table heat means disposed near a portion of the table for supplying heat to the table in an activated position of the table heat means; and control means connected to the chamber heat means and the drive means activating the chamber heat means and the drive means in one position of the control means, a portion of the control means connected to the table heat means activating the table heat means in one position of the control means.

* * * * *